(12) United States Patent
Ratcliff (10) Patent No.: US 7,856,474 B2
(45) Date of Patent: Dec. 21, 2010

(54) METHOD AND APPARATUS FOR IDENTIFYING DOCUMENTS USING A HANDHELD DEVICE

(75) Inventor: Raymond F. Ratcliff, Austin, TX (US)

(73) Assignee: Wireless Recognition Technologies LLC, Frisco, TX (US)

( * ) Notice: Subject to any disclaimer, the term of this patent is extended or adjusted under 35 U.S.C. 154(b) by 0 days.

(21) Appl. No.: 11/780,895

(22) Filed: Jul. 20, 2007

(65) Prior Publication Data

US 2008/0010346 A1     Jan. 10, 2008

Related U.S. Application Data

(63) Continuation of application No. 09/818,003, filed on Mar. 27, 2001, now Pat. No. 7,392,287.

(51) Int. Cl.
*G06F 15/16*     (2006.01)
(52) U.S. Cl. .............. 709/205; 709/217; 707/E17.008; 370/389; 250/236
(58) Field of Classification Search ............. 709/205, 709/217; 707/E17.008; 370/389; 250/236
See application file for complete search history.

(56) References Cited

U.S. PATENT DOCUMENTS

| | | | |
|---|---|---|---|
| 5,655,081 A | 8/1997 | Bonnell et al. | |
| 5,680,548 A | 10/1997 | Trugman | |
| 5,740,549 A | 4/1998 | Reilly et al. | |
| 5,978,594 A | 11/1999 | Bonnell et al. | |
| 5,978,829 A | 11/1999 | Chung et al. | |
| 6,032,137 A | 2/2000 | Ballard | |
| 6,041,398 A | 3/2000 | Pechanek et al. | |
| 6,112,225 A | 8/2000 | Kraft et al. | |
| 6,167,428 A | 12/2000 | Ellis | |
| 6,167,462 A | 12/2000 | Davis et al. | |
| 6,229,139 B1 * | 5/2001 | Neukermans et al. | 250/236 |
| 6,510,509 B1 | 1/2003 | Chopra | |
| 6,515,988 B1 * | 2/2003 | Eldridge et al. | 370/389 |
| 6,628,412 B1 * | 9/2003 | Jeran et al. | 358/1.14 |
| 6,707,581 B1 * | 3/2004 | Browning | 358/473 |
| 6,725,250 B1 | 4/2004 | Ellis et al. | |
| 6,732,141 B2 | 5/2004 | Ellis | |
| 6,765,559 B2 * | 7/2004 | Hayakawa | 345/173 |
| 6,771,568 B2 * | 8/2004 | Hochendoner | 369/30.06 |
| 6,782,144 B2 * | 8/2004 | Bellavita et al. | 382/310 |
| 7,343,324 B2 * | 3/2008 | Lao et al. | 705/26 |
| 7,392,287 B2 * | 6/2008 | Ratcliff, III | 709/205 |

(Continued)

*Primary Examiner*—Kyung-Hye Shin
(74) *Attorney, Agent, or Firm*—Dillon & Yudell LLP (57) ABSTRACT

A method and apparatus for sending information to a data processing apparatus for identifying a document to share with a recipient. A handheld device is capable of communicating with the data processing apparatus. Human-readable information is captured from the document and stored in the handheld device as document data. A communications path is established between the handheld device and the data processing apparatus. The document data is sent to the data processing apparatus through the communications path. Reference documents are provided. Each reference document has reference data stored in a memory. At least a portion of the received document data is extracted as scanning data. The reference data is retrieved from the memory. The scanning data is compared with the reference data. When the scanning data matches at least a portion of the reference data of one of the reference documents, the one reference document is selected as the identified document for forwarding to the recipient.

56 Claims, 3 Drawing Sheets

U.S. PATENT DOCUMENTS

| | | |
|---|---|---|
| 2001/0039497 A1 | 11/2001 | Hubbard |
| 2002/0013832 A1 | 1/2002 | Hubbard |
| 2002/0019844 A1 | 2/2002 | Kurowski |
| 2002/0111210 A1 | 8/2002 | Luciano |
| 2002/0116291 A1* | 8/2002 | Grasso et al. ............... 705/27 |
| 2003/0055679 A1 | 3/2003 | Soll |
| 2003/0157976 A1 | 8/2003 | Simon |

* cited by examiner

METHOD AND APPARATUS FOR IDENTIFYING DOCUMENTS USING A HANDHELD DEVICE

CROSS REFERENCE TO RELATED APPLICATIONS

This application is a Continuation of U.S. application Ser. No. 09/818,003 filed Mar. 27, 2001, the entirety of which is incorporated herein by reference.

FIELD

The present invention relates generally to sharing information and, more particularly, to identifying a document from information input to a handheld device and forwarding the document to a designated recipient.

BACKGROUND

Sharing information from documents is generally a manual and time-consuming process. When an individual reads a newspaper or magazine article and wishes to share the article with someone, he must endure a multi-stepped process fraught with frustration and potential for mistake.

A number of conventional means for sharing documents are available, although none are particularly palatable. In the above example, to share the newspaper or magazine article, the individual would have to choose one of the following means: physically tear out or photocopy the article and mail it, photocopy the article and fax it, read the article over the phone, scan the article into a computer and send it electronically, or visit the website for the newspaper or magazine, find the article, then send the uniform resource locator ("URL") for the website to the desired recipient.

The tasks above are needlessly time consuming and problematic. In the time required to manipulate the physical document and arrange for sending, the recipient could have already read the article and discussed it with the sender, if only the recipient had received the article sooner. Moreover, with all of the effort required on the part of the sender to coordinate sending the document, there is a strong likelihood the sender may lose interest altogether and not even attempt to send the article.

SUMMARY

One aspect of the present invention relates to sending information to a data processing apparatus for identification of a document having the information. A handheld device having a memory is capable of communicating with the data processing apparatus. Information is captured from the document. The captured information is stored in the memory of the handheld device as document data. A communications path is established between the handheld device and the data processing apparatus. The document data is retrieved from the memory of the handheld device and sent to the data processing apparatus through the communications path for identification of the document.

Another aspect of the present invention relates to identifying the document for sharing with a recipient, in the data processing apparatus. Reference documents are provided. Each reference document has reference data stored in a memory. The document data received from the handheld device is associated with one of the reference documents. At least a portion of the received document data is extracted as scanning data. The reference data is retrieved from the memory. The scanning data is compared with the reference data. When the scanning data matches at least a portion of the reference data of one of the reference documents, the one reference document is selected as the identified document.

BRIEF DESCRIPTION OF THE FIGURES

The invention may be better understood with reference to the following figures. The components in the figures are not necessarily to scale, emphasis instead being placed upon clear illustration of principles.

DETAILED DESCRIPTION

Figure 1:
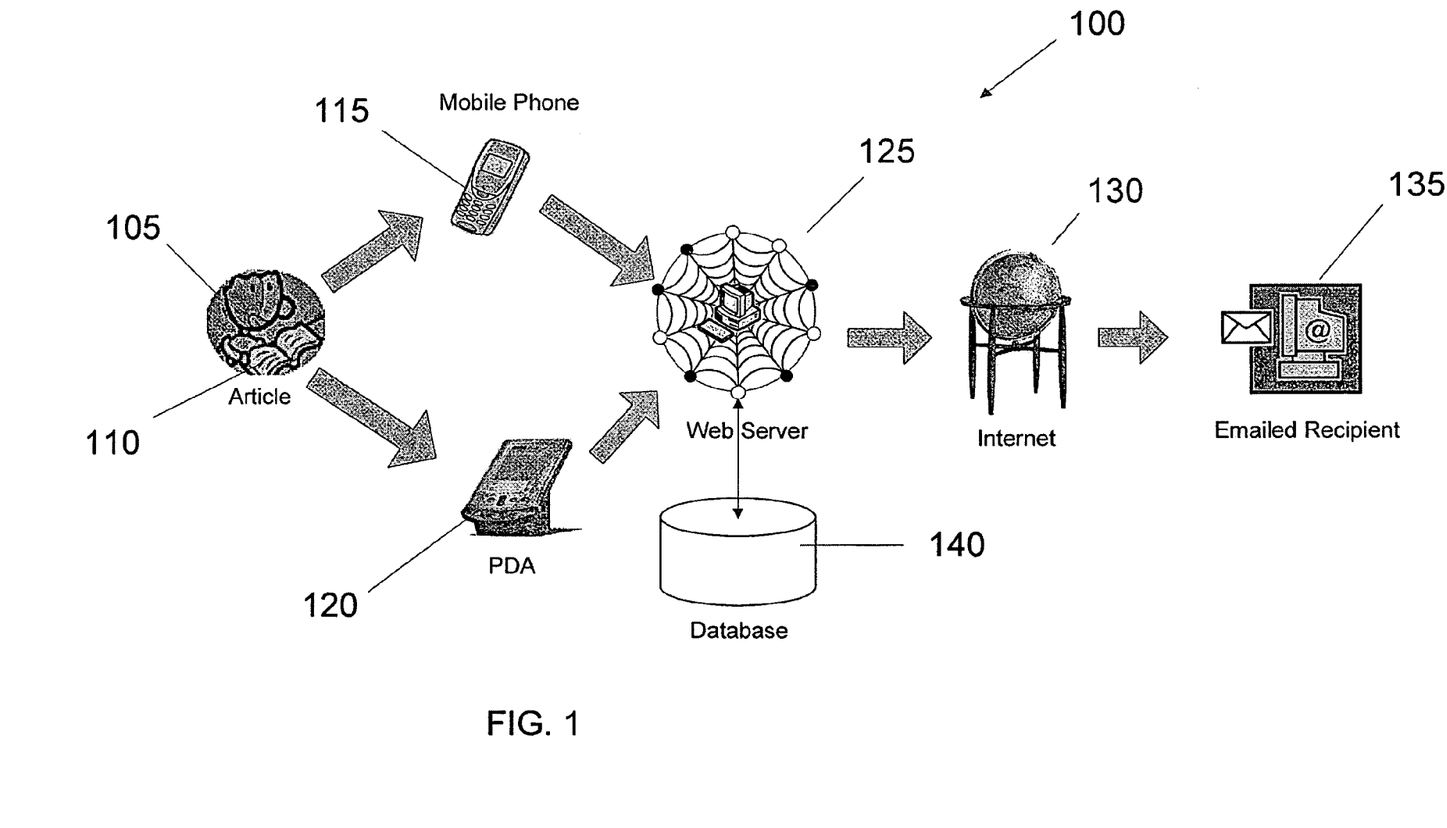
FIG. 1 is a block diagram of a system 100 for identifying a document and forwarding the document to a designated recipient, constructed according to an exemplary embodiment of the present invention.

FIG. 1 is a block diagram of a system 100 for identifying a document and forwarding the document to a designated recipient, constructed according to an exemplary embodiment of the present invention. In FIG. 1, a user 105, also referred to herein as a sender, locates a data source such as document 110. In some examples, the document 110 is a physical document such as an article in a periodical like a newspaper or magazine. In other examples, the document 110 is in electronic form, such as a word processing document or HTML document displayed on a handheld device or other data processing apparatus. Upon reading the document 110, the user 105 realizes he has several associates or desired recipients who, he believes, would also be interested in reading the document 110.

In FIG. 1, the user 105 operates a handheld device such as a mobile phone 115 or personal digital assistant ("PDA") 120. Other exemplary handheld devices include the following sold under their respective trademarks: Handspring VISOR™, Palm PALM™, HP JORNADA™, Compaq IPAQ™, Research In Motion BLACKBERRY™, NEOPOINT® Smart Phone, PSION® Series 7, NOKIA® Communicator 9000il, Samsung SCH-3500 Smart Phone, and SPRINT PCS TOUCHPOINT™. Other suitable handheld devices include watches and combinations of the above handheld devices. Such watches and devices include Qbe Personal Computing Tablet, QUBIT™ Tablet, Intel Tablet, ONHAND™ PC, daVinci, Franklin REX, Sharp ZAURUS®, Motorola PAGEWRITER® 2000x, and Sharp telMail TM-20.

In FIG. 1, each of the handheld devices 115 and 120 includes a memory for storing data, such as a memory 310 described below with reference to FIG. 3. The various handheld devices operated by user 105 are capable of communicating with a data processing apparatus such as a server 125. A communications path can be established between the handheld devices and the server 125 by conventional techniques, including cellular and other wireless means.

In some exemplary embodiments, part or all of server 125 is implemented as the data processing apparatus 300 described with reference to FIG. 3. World Wide Web ("Web") servers may be readily incorporated. The server 125 is coupled to and in communication with a data network 130 such as the Internet, using conventional techniques understood by those skilled in the art. The server 125 is in communication with a storage means 140 such as a database or other suitable repository. In one example, server 125 is directly coupled to repository 140. In another example, server 125 communicates with repository 140 via data network 130. Reference data is stored in storage means 140 for use by server 125, as explained in greater detail below.

In FIG. 1, one example of data network 130 is the Internet. In other examples, data network 130 is any network with sufficient bandwidth to transmit data signals received from handheld devices such as mobile phone 115 and PDA 120. Suitable networks include frame relay (FR) networks, ATM networks, wide area networks (WAN), and local area networks (LAN). Other suitable networks 130 include satellite transmission, radio broadcasting, cable television broadcasting, direct line-of-site transmission, telecom fiber optic transmission, cellular transmission, and wireless transmission, as will be understood by the skilled artisan.

In FIG. 1, a recipient 135 is also capable of communicating with data network 130 by conventional means. For example, recipient 135 may be or include a data processing apparatus or computer system such as a laptop computer, handheld device, cellular phone with data network capabilities, and other devices capable of receiving data signals such as e-mail messages from data network 130.

Figure 2:
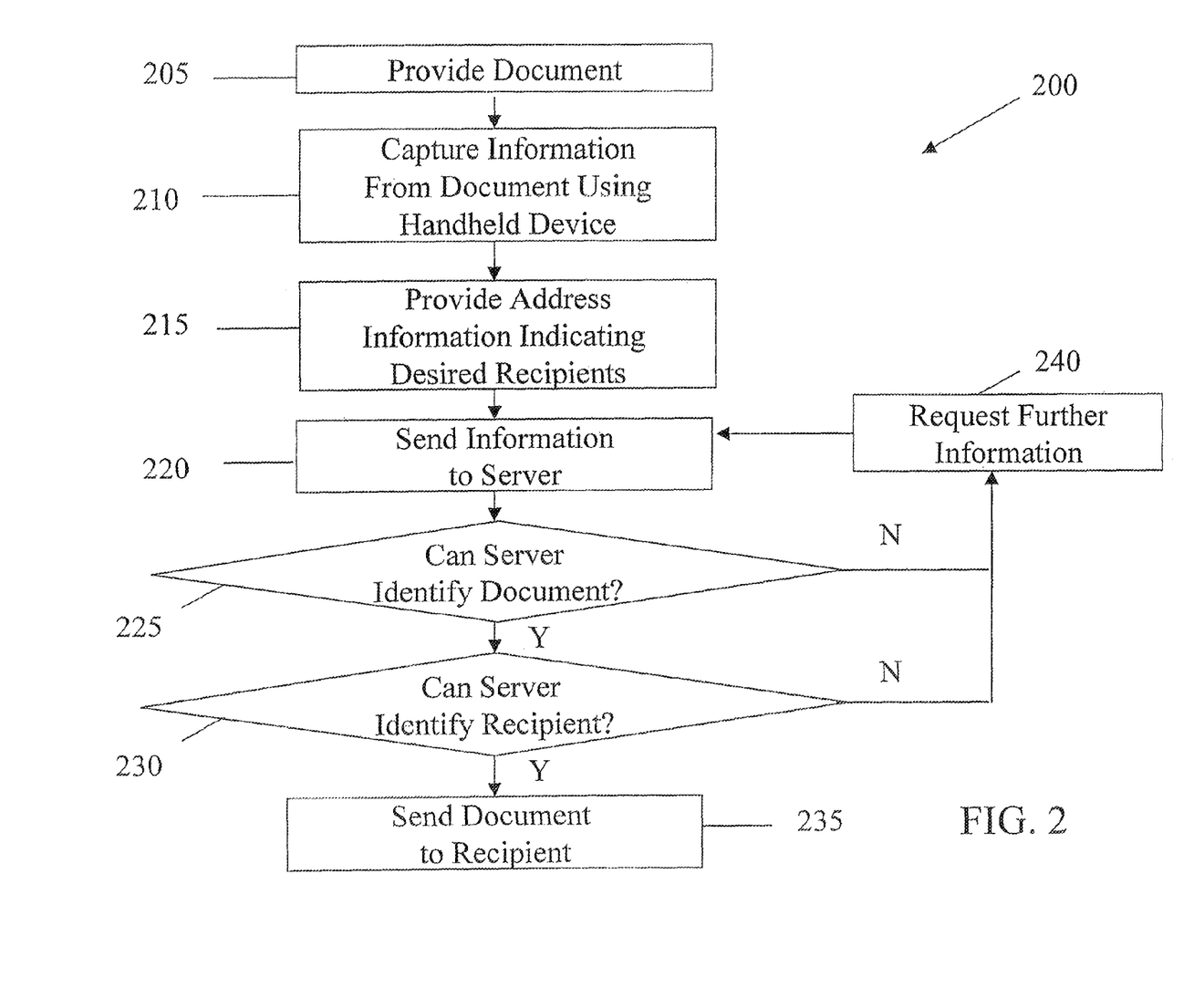
FIG. 2 is a flow diagram of a method 200 for identifying a document and forwarding the document to a designated recipient, performed in accordance with an exemplary embodiment of the present invention.

FIG. 2 is a flow diagram of a method 200 for identifying a document and forwarding the document to a designated recipient, performed in accordance with an exemplary embodiment of the present invention. In FIG. 2, the method begins with user 105 identifying document 110 in step 205.

In step 210, the user 105 captures information from the document 110. In some exemplary embodiments, the handheld device includes an input device such as a microphone and is thus capable of receiving audio voice signals. The user 105 can convey information by speaking into the microphone. In an alternative embodiment, the microphone is physically separated from the handheld device, yet coupled to the device so the audio signals can easily pass to the device for storage in memory. In another exemplary embodiment, the handheld device is provided with a scanning mechanism. In one example, the scanning mechanism is provided as a "plug-in" cartridge that interfaces with the handheld device, as with the Handspring VISOR™ PDA. The scanner can be coupled to the handheld device by other means for scanning the information from the document and conveying the information to the handheld device for storage. Conventional scanners may be used, as will be understood by those skilled in the art. Other conventional means for converting printed text from the document to digital data may readily be used.

Various types of information can be captured from the document and stored in the handheld device. Suitable information includes: title of the document 110, author, publication name (e.g., name of newspaper or magazine), and the date of publication for document 110. The captured information can include one or more of these types of information and/or other types of information.

When the information is captured by the scanner or scanning mechanism, the scanned information is converted to digital data using conventional techniques. Also, audio signals received by the microphone are converted to digital data using a digital-to-audio ("D/A") converter or other suitable means. The digital data is then stored in a memory within the handheld device as captured information or document data.

In FIG. 2, the user also provides address information identifying a receiving address for desired recipient 135 in step 215. In one example, an e-mail address for the desired recipient is spoken into the microphone of the handheld device using techniques described above. In another example, the name of the recipient is spoken into the device for a later table lookup operation performed by the server 125. In yet another example, an e-mail address or mailing address is typed into the handheld device by the user using a keypad incorporated for data entry. This address information is stored in the memory of the handheld device.

In FIG. 2, after the document information is captured and the address information received by the handheld device, a communications path is established between the handheld device and the server 125. In some exemplary embodiments, such communications are established via one or more of the many types of data networks 130 described above. In step 220, the captured document information and the address information are retrieved from the memory in the handheld device and sent to the server 125 via the established communications path. The server 125 then receives the captured document information and the address information.

In step 225, the server 125 then extracts at least a portion of the received document data as scanning data. This extraction may be performed using conventional voice recognition programs to extract portions of digital audio signals and convert these to text-based digital data. Suitable voice recognition programs include Dragon NATURALLY SPEAKING®, Lernout & Hauspie L&H VOICE XPRESS™, and Lernout & Hauspie Power Translator Pro. In step 225, the server attempts to identify the source document 110 using the captured information. To this end, server 125 cross-references the extracted portion of the information with reference data associated with a plurality of reference documents stored in repository 140. That is, the data processing apparatus accesses the reference data, and compares the scanning data with the reference data. In an alternative embodiment, this cross-referencing operation is performed by a human who uses the extracted portion of the information to index physical documents to identify one or more documents having information matching the extracted portion of information.

In step 230, the server 125 extracts the address data from the information received from the handheld device. For digital address data representing an e-mail address, phone number, or postal mailing address spoken into the microphone, a conventional voice recognition program is used to convert the voice-based address data to text-based digital data. The server 125 then attempts to identify the recipient using the text-based digital data. In some embodiments, when the address data is spoken or typed exactly, the text-based address data is used directly as the mailing address. In other embodiments, a table lookup operation is performed by server 125 using the text-based address data by cross-referencing a directory or listing of e-mail addresses associated with real names. This listing is maintained in storage medium 140. In an alternative embodiment, this table lookup operation is performed by a human, as will be appreciated by those skilled in the art.

Proceeding to step 240, when the server cannot identify one of the referenced documents in step 225, or server 125 cannot identify recipient 135 from the address information 230, server 125 sends a signal to the handheld device operated by the user, such as an e-mail message passed via data network 130. This signal includes a message requesting further information and/or clarification of the data already submitted. For example, if the system identified two or more documents matching the captured information, the message prompts the user to specify which of the identified documents to send to recipient 135. Alternatively, the user may be prompted to re-enter address information. The method then returns to step 220, when the user sends such information to the server. In steps 225 and/or 230, the server again attempts to identify the document and/or identify the recipient.

In FIG. 2, the loop represented by steps 220, 225, 230, and 240, repeats as necessary until the proper information is gathered by server 125. In step 235, the identified document can then be sent to the person identified in the identification information. Depending on the type of address information input by the user 105, this sending can be performed by attaching an electronic copy of the identified document to an e-mail message and sending the message to a designated e-mail address of the recipient, or sending an electronic copy of the document by facsimile transmission to a designated phone number. Alternatively, a hard copy of the document can be mailed to a residential mailing address for the recipient.

Figure 3:
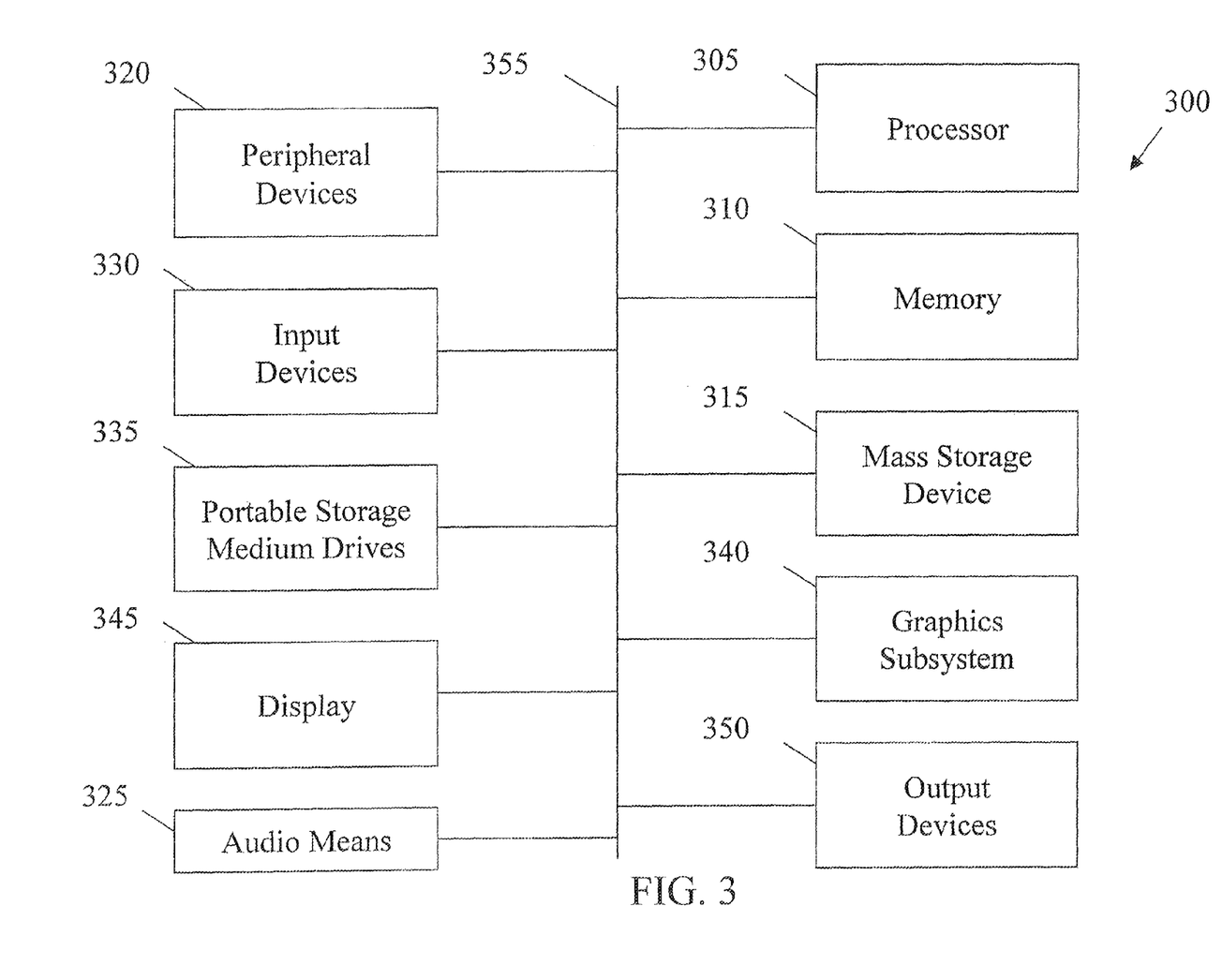
FIG. 3 is a block diagram of a data processing apparatus 300 constructed according to an exemplary embodiment of the present invention.

FIG. 3 is a block diagram of a data processing apparatus 300 that can be incorporated as part of both the handheld device and/or the server 125 in FIG. 1. The data processing apparatus 300 includes a processor 305 for executing program instructions stored in a memory 310. In some embodiments, processor 305 includes a single microprocessor, while in others, processor 305 includes a plurality of microprocessors to define a multi-processor system. The memory 310 stores instructions and data for execution by processor 305, including instructions and data for performing the methods described above. Depending upon the extent of software implementation in data processing apparatus 300, the memory 310 stores executable code when in operation. The memory 310 includes, for example, banks of read-only memory (ROM), dynamic random access memory (DRAM), as well as high-speed cache memory.

In FIG. 3, within data processing apparatus 300, an operating system comprises program instruction sequences that provide a platform for the methods described above. The operating system provides a software platform upon which application programs may execute, in a manner readily understood by those skilled in the art. The data processing apparatus 300 further comprises one or more applications having program instruction sequences for performing the methods described above.

In FIG. 3, the data processing apparatus 300 incorporates any combination of additional devices. These include, but are not limited to, a mass storage device 315, one or more peripheral devices 320, an audio means 325, one or more input devices 330, one or more portable storage medium drives 335, a graphics subsystem 340, a display 345, and one or more output devices 350. The various components are connected via an appropriate bus 355 as known by those skilled in the art. In alternative embodiments, the components are connected through other communications media known in the art. In one example, processor 305 and memory 310 are connected via a local microprocessor bus; while mass storage device 315, peripheral devices 320, portable storage medium drives 335, and graphics subsystem 340 are connected via one or more input/output ("I/O") buses.

In FIG. 3, mass storage device 315 is implemented as fixed and/or removable media, for example, as a magnetic, optical, or magneto-optical disk drive. The drive is preferably a nonvolatile storage device for storing data and instructions for use by processor 305. In some embodiments, mass storage device 315 stores client and server information, code for carrying out methods in accordance with exemplary embodiments of the invention, and computer instructions for processor 305. In other embodiments, computer instructions for performing methods in accordance with exemplary embodiments of the invention also are stored in processor 305. The computer instructions are programmed in a suitable language such as Java or C++.

In FIG. 3, the portable storage medium drive 335, in some embodiments, operates in conjunction with a portable nonvolatile storage medium, such as a floppy disk, CD-ROM, or other computer-readable medium, to input and output data and code to and from the data processing apparatus 300. In some embodiments, methods performed in accordance with exemplary embodiments of the invention are implemented using computer instructions that are stored on such a portable medium and input to the data processing apparatus 300 via portable storage medium drive 335.

In FIG. 3, the peripheral devices 320 include any type of computer support device, such as an I/O interface, to add functionality to data processing apparatus 300. In one example, the peripheral devices include a network interface card for interfacing the data processing apparatus 300 to a network, a modem, and the like. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 3, the graphics subsystem 340 and the display 345 provide output alternatives of the system. The graphics subsystem 340 and display 345 include conventional circuitry for operating upon and outputting data to be displayed, where such circuitry preferably includes a graphics processor, a frame buffer, and display driving circuitry. The display 345 may include a cathode ray tube (CRT) display, a liquid crystal display (LCD), or other suitable devices. The display 345 preferably can display at least 256 colors. The graphics subsystem 340 receives textual and graphical information and processes the information for output to the display 345. A video card in the data processing apparatus 300 also comprises a part of graphics subsystem 340 and also preferably supports at least 256 colors. For optimal results in viewing digital images, the user should use a video card and monitor that can display the True Color (24 bit color) setting. This setting enables the user to view digital images with photographic image quality.

In FIG. 3, audio means 325 preferably includes a sound card, on-board sound processing hardware, or a device with built-in processing devices that attach via Universal Serial Bus (USB) or IEEE 1394 (Firewire). The audio means 325 receives audio signals from a peripheral microphone. In addition, audio means 325 may include a processor for processing sound. The signals can be processed by the processor in audio means 325 of data processing apparatus 300 and passed to other devices as, for example, streaming audio signals.

In some embodiments, programs for performing methods in accordance with exemplary embodiments of the invention are embodied as computer program products. These generally include a storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other media.

Stored on one or more of the computer readable media, the program includes software for controlling both the hardware of a general purpose or specialized computer or microprocessor. This software also enables the computer or microprocessor to interact with a human or other mechanism -utilizing the results of exemplary embodiments of the invention. Such software includes, but is not limited to, device drivers, operating systems and user applications. Preferably, such computer readable media further include software for performing the methods described above.

In certain other embodiments, a program for performing an exemplary method of the invention or an aspect thereof is situated on a carrier wave such as an electronic signal transferred over a data network. Suitable networks include the internet, a frame relay network, an ATM network, a wide area network (WAN), or a local area network (LAN). Those skilled in the art will recognize that merely transferring the program over the network, rather than executing the program on a computer system or other device, does not avoid the scope of the invention.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed:

1. A method comprising:
   storing a plurality of reference documents in a memory device, including storing reference data for each reference document of the plurality of reference documents, wherein the reference data comprises data representing human-readable content from an associated reference document of the plurality of reference documents;
   receiving over a wireless connection, document data at a data processing system from a handheld device, wherein the document data corresponds to content of one of the reference documents of the plurality of reference documents, and wherein the document data comprises data captured from human-readable content in a document when scanned by the handheld device, wherein the human-readable content comprises originally published content of the document;
   extracting at least a portion of the received document data as scanning data, wherein the scanning data comprises data representing human-readable content from the document;
   retrieving from the memory device the reference data for at least one reference document of the plurality of reference documents;
   comparing the scanning data with the retrieved reference data, wherein comparing comprises a comparison of (a) the scanning data corresponding to the human-readable content of the document, and (b) the retrieved reference data for the at least one reference document of the plurality of reference documents comprising human-readable content of the at least one reference document as originally published; and
   identifying, when the step of comparing the scanning data with the retrieved reference data indicates the scanning data matches at least a portion of the retrieved reference data, one or more reference documents associated with said matched reference data as the reference documents corresponding to the document data received from the handheld device.

2. The method of claim 1, further comprising sending at least a portion of the identified reference documents to the handheld device.

3. The method of claim 2, wherein at least one of the steps of receiving, retrieving, comparing and identifying are performed by a data processing system of a server connected to the handheld device by a wireless network connection.

4. The method of claim 3, further comprising presenting the matching documents via the handheld device on a user interface capable of receiving user input identifying one of the two or more reference documents of the plurality of reference documents that are identified as the one reference document as the document scanned by the handheld device.

5. The method of claim 3, further wherein the scanning data does not correspond to non-human-readable information captured from the document that identifies the document and was added to the document after it was originally published.

6. The method of claim 2, further comprising sending at least a portion of human-readable content from each of a plurality of matching documents of the plurality of reference documents to the handheld device, wherein the matching documents comprise two or more reference documents of the plurality of reference documents that are identified as the one reference document as the document scanned by the handheld device.

7. The method of claim 1, wherein the document data is received from the handled device over a wireless data connection.

8. The method of claim 1, wherein the scanning data extracted from the received document data includes digital text data.

9. The method of claim 8, wherein the digital text data is derived from any one of a text data and a graphical data.

10. The method of claim 1, further comprising sending at least a portion of the identified document to a the receiving address.

11. The method of claim 10, wherein the receiving address information identifies the receiving address of the handheld device.

12. The method of claim 11, wherein sending at least a portion of the identified document includes:
    sending at least a portion of the identified document to the receiving address via transmission over a data network coupling the handheld device to the data processing system.

13. The method of claim 1, wherein a user operating the handheld devices is informed if no match is found between the document data received from the handheld device and the retrieved reference data.

14. A data processing system for identifying one of a plurality of reference documents, from information received from a handheld device in communication with a data processing system, the data processing system being coupled to a data network and each reference document having reference data, the data processing system comprising:
    at least one memory device in which a plurality of instructions are stored; and
    a processor coupled to the at least one memory device and capable of executing instructions in the memory device to one or more of said plurality of instructions to: (i) access said reference data in the at least one memory device, and (ii) receive the information from the handheld device, wherein the information comprises actual data scanned from a document by the handheld device, wherein execution of the instructions causing a plurality of steps to be performed including:
    storing a plurality of reference documents, each reference document having associated reference data stored in the at least one memory device coupled to the data processing system, wherein the associated reference data for each reference document comprises data representing content from the associated reference document of the plurality of reference documents;

receiving the information from a handheld device in communication with the data processing system;

extracting at least a portion of the received document data as scanning data, wherein the scanning data corresponds to data captured by the handheld device from human-readable content of a document;

retrieving reference data for at least one reference document of the plurality of reference documents from the at least one memory device;

comparing said scanning data with said reference data, wherein said comparing comprises a comparison of (a) scanning data corresponding to the human-readable content of the one reference document, and (b) the reference data for the at least one reference document of the plurality of reference documents comprising human-readable content of the at least one reference document as originally published; and identifying, when the scanning data matches at least a portion of the reference data associated with the at least one reference document, the at least one reference document as an identified document.

15. The data processing system of claim 14, wherein the execution of the instructions by the processor causes further steps to be performed, namely:

receiving address information identifying a receiving address for a recipient;

establishing a communications path between the data processing system and a device of the recipient via the data network, and sending, using the address information, the at least a portion of human-readable content of the identified reference document to the receiving address of the recipient via the communications path.

16. The data processing system of claim 15, wherein sending at least a portion of the identified reference document includes:

sending at least a portion of the identified reference document to the receiving address via transmission over a data network coupling the handheld device to the data processing system.

17. The data processing system of claim 15, wherein sending at least a portion of the identified reference document includes:

sending at least a portion of the identified reference document to the receiving address via a communications transmission.

18. The data processing system of claim 15, wherein sending at least a portion of the identified reference document includes sending an image of at least a portion of the identified reference document.

19. The data processing system of claim 14, further comprising presenting the matching documents via the handheld device on a user interface capable of receiving user input identifying one of the two or more reference documents of the plurality of reference documents that are identified as the one reference document as the document scanned by the handheld device.

20. A method comprising:

capturing information regarding a document utilizing a handheld device, wherein the information comprises actual data from the document, wherein the captured information corresponds to human-readable content from the document and does not comprise information exclusively machine readable;

storing the captured information in a memory of the handheld device;

establishing a communications path between the handheld device and a data processing system coupled to a data network;

sending the captured information from the handheld device to the data processing system via the communications path; and receiving, at the handheld device from the data processing system via the communications path, data representing at least a portion of data from a reference document identified based on the captured information.

21. The method of claim 20, wherein the step of receiving at least a portion of data from a reference document comprises receiving at least a portion of human-readable content of the document.

22. The method of claim 21, wherein the step of receiving includes receiving an image of a portion of the document.

23. The method of claim 21, wherein the document is an electronic document.

24. The method of claim 21, wherein the document is a physical document.

25. The method of claim 24, wherein the physical document provides information to a user.

26. The method of claim 20, wherein capturing the information includes capturing an image of a portion of a physical copy of the document.

27. The method of claim 20, wherein capturing the information includes:

scanning the document to generate scanned information; and converting the scanned information to digital text data;

wherein storing the captured information includes storing the digital text data.

28. The method of claim 20, wherein capturing the information includes:

receiving audio information as spoken audio, and converting the audio information to digital audio data; and wherein storing the captured information includes storing the digital audio data.

29. The method of claim 20, further comprising receiving the matching documents via the handheld device on a user interface capable of receiving user input identifying one of the two or more reference documents of the plurality of reference documents that are identified as the one reference document as the document scanned by the handheld device.

30. A wireless handheld device operable to establish a wireless data communications path with a data processing system coupled to a wireless data network, comprising:

(i) a transceiver operating to receive and transmit a wireless data connection with the data processing system coupled to the wireless data network, the transceiver being capable of:

establishing a wireless communications path between the handheld device and the data processing system coupled to the wireless data network;

sending captured information from the handheld device to the data processing system via the wireless communications path; and (ii) a memory in which a plurality of instructions are stored; and (iii) a processor coupled to the memory and capable of executing the instructions in the memory, wherein execution of the instructions causes a plurality of steps to be performed including:

capturing information regarding a document utilizing the handheld device as scanning data, wherein the information comprises actual data from the document, wherein the captured information corresponds to human-readable content from the document;
storing the captured information in a memory of the handheld device;
receiving, at the handheld device from the data processing system via the wireless data communications path, data representing a comparing operation and an identifying operation performed at a remote server;
the comparing operation comprising: comparing the scanning data with reference data retrieved at the server wherein a comparison is performed of (a) the scanning data corresponding to the human-readable content of the document, and (b) the retrieved reference data for the at least one reference document of a plurality of reference documents comprising human-readable content; and
the identifying operation comprising: identifying, when the comparing of the scanning data with the retrieved reference data indicates the scanning data matches at least a portion of the retrieved reference data, one or more reference documents associated with said matched reference data as the reference documents corresponding to the data received from the handheld device.

31. The handheld device of claim 30, wherein the document is an electronic document.

32. The handheld device of claim 30, wherein the document is a physical document.

33. The handheld device of claim 32, wherein capturing the information includes capturing an image of a portion of the document.

34. The handheld device of claim 30, wherein capturing the information includes:
scanning the document to generate scanned information, and converting the scanned information to digital text data; and
wherein storing the captured information includes storing the digital text data.

35. The handheld device of claim 30, wherein capturing the information includes:
receiving audio information as spoken audio, and
converting the audio information to digital audio data,
wherein storing the captured information includes storing the digital audio data.

36. The handheld device of claim 30, wherein the handheld device is a cellular phone.

37. The handheld device of claim 30, wherein the handheld device is a personal digital assistant.

38. The handheld device of claim 30, wherein the handheld device effects communications over the wireless data communications path with other network devices.

39. The handheld device of claim 30, wherein the handheld device captures the information using an image capture capability of the handheld device.

40. A non-transitory processor readable storage medium containing processor readable program code such that when executed by a processor in a data processing system, performs a method for identifying one of a plurality of reference documents, each reference document having reference data stored in a memory, based on information received by the data processing system from a handheld device in wireless communication with the data processing system over a data network, the method comprising:
storing a plurality of reference documents in a memory device, including storing reference data for each reference document of the plurality of reference documents, wherein the reference data comprises data representing content from an associated reference document of the plurality of reference documents, wherein the content comprises human-readable content of the associated reference document;
receiving document data at a data processing system from a handheld device over the wireless communication, wherein the document data corresponds to the human-readable content of one of the reference documents of the plurality of reference documents, and wherein the document data comprises data captured from human-readable content in the one reference document when scanned by the handheld device, wherein the human-readable content comprises originally published content of the one reference document;
extracting at least a portion of the received document data as scanning data, wherein the scanning data corresponds to the human-readable content from the document;
retrieving from the memory device the reference data for at least one reference document of the plurality of reference documents;
comparing the scanning data with the retrieved reference data, wherein comparing comprises a comparison of (a) the scanning data corresponding to the human-readable content of the document, and (b) the reference data for the at least one reference document of the plurality of reference documents comprising human-readable content of the at least one reference document as originally published; and
identifying, when the scanning data matches at least a portion of the retrieved reference data, the one reference document as the document.

41. The processor readable storage medium of claim 40, wherein the document is an electronic document.

42. The processor readable storage medium of claim 40, wherein the document is a physical document.

43. The processor readable storage medium of claim 42, wherein the human-readable content comprises actual data that is in printed or graphical format and capable of being read by a human without requiring machine intervention.

44. The processor readable storage medium of claim 40, further comprising converting the scanning data to digital text data and storing the digital text data.

45. The processor readable storage medium of claim 40, further comprising converting the scanning data to digital audio data and storing the digital audio data.

46. The processor readable storage medium of claim 40, further comprising presenting the matching documents via the handheld device on a user interface capable of receiving user input identifying one of the two or more reference documents of the plurality of reference documents that are identified as the one reference document as the document scanned by the handheld device.

47. A method, comprising:
optically scanning a human-readable content from a document comprising multiple pieces of human-readable content;
generating a scanned information from the human-readable content;
converting the scanned information into a digital document data representative of the human-readable content and operable for being stored by a data processing system;
storing the digital document data in a memory of a data processing system;
storing a plurality of reference documents, wherein the storing comprises storing a plurality of reference data for each of the plurality of reference documents in a memory of a data processing system, wherein said reference data comprises data representing content from an associated one of said reference documents of said plurality of reference documents, and wherein the content comprises a human-readable content of the associated reference document;

comparing at least one first data to a database of at least one second data, at least one of the at least one said data being received over a wireless connection, wherein the at least one first data comprises the digital document data, the at least one second data comprises at least one of the plurality of reference data, and the database comprises said memory of the data processing system storing the plurality of reference data; and identifying, when the comparing indicates the first data matches at least a portion of one or more of the second data, the one or more reference documents associated with said matched reference data as the respective one or more reference documents corresponding to the scanned human-readable content.

48. The method of claim 47, wherein the storing of the digital document data is performed in a memory of a data processing system of a handheld device.

49. The method of claim 48, wherein the storing of the plurality of reference documents is performed in a memory of a data processing system of a server.

50. The method of claim 49, wherein the comparing is performed in the data processing system of the server.

51. The method of claim 50, wherein the identifying is performed in the data processing system of the server, and the results thereof are transmitted to the handheld device.

52. The method of claim 51, wherein the data processing system of the server cannot identify a single one of the reference documents corresponding to the first data.

53. The method of claim 52, wherein the fact that the data processing system of the server cannot identify a single one of the reference documents corresponding to the first data is communicated over a wireless, cellular connection to the handheld device.

54. The method of claim 53, wherein the handheld device is operable to permit a user to optically re-scan a human-readable content from a document comprising multiple pieces of human-readable content, which action causes re-execution of the steps of generating a scanned information, converting the scanned information into a digital document data, storing the digital document data in a memory of a data processing system, storing a plurality of reference documents, comparing at least one first data to a database of at least one second data, and identifying the one or more reference documents associated with said matched reference data.

55. The method of claim 49, wherein the memory of the data processing system of the server comprises any one of a directly coupled repository and a repository coupled by a data network connection.

56. The method of claim 48, wherein the handheld device comprises at least one of: a mobile phone; and a personal digital assistant (PDA).

\* \* \* \* \*

US 007856474 C1

(12) INTER PARTES REEXAMINATION CERTIFICATE (719th)
United States Patent
Ratcliff (10) Number: US 7,856,474 C1
(45) Certificate Issued: Oct. 28, 2013

(54) METHOD AND APPARATUS FOR IDENTIFYING DOCUMENTS USING A HANDHELD DEVICE (75) Inventor: Raymond F. Ratcliff, Austin, TX (US)

(73) Assignee: Wireless Recognition Technologies LLC, Frisco, TX (US)

Reexamination Request:
No. 95/001,557, Feb. 25, 2011

Reexamination Certificate for:
Patent No.: 7,856,474
Issued: Dec. 21, 2010
Appl. No.: 11/780,895
Filed: Jul. 20, 2007

Related U.S. Application Data (63) Continuation of application No. 09/818,003, filed on Mar. 27, 2001, now Pat. No. 7,392,287.

(51) Int. Cl.
*G06F 15/16* (2006.01)

(52) U.S. Cl.
USPC .................. 709/205; 709/217; 707/E17.008; 370/389; 250/236

(58) Field of Classification Search
None
See application file for complete search history.

(56) References Cited

To view the complete listing of prior art documents cited during the proceeding for Reexamination Control Number 95/001,557, please refer to the USPTO's public Patent Application Information Retrieval (PAIR) system under the Display References tab.

*Primary Examiner* — Rachna Desai (57) ABSTRACT

A method and apparatus for sending information to a data processing apparatus for identifying a document to share with a recipient. A handheld device is capable of communicating with the data processing apparatus. Human-readable information is captured from the document and stored in the handheld device as document data. A communications path is established between the handheld device and the data processing apparatus. The document data is sent to the data processing apparatus through the communications path. Reference documents are provided. Each reference document has reference data stored in a memory. At least a portion of the received document data is extracted as scanning data. The reference data is retrieved from the memory. The scanning data is compared with the reference data. When the scanning data matches at least a portion of the reference data of one of the reference documents, the one reference document is selected as the identified document for forwarding to the recipient.

At the time of issuance and publication of this certificate, the patent remains subject to pending reexamination control number 95/002,361 filed Sep. 14, 2012. The claim content of the patent may be subsequently revised if a reexamination certificate issues from the reexamination proceeding.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-56 are cancelled.

\* \* \* \* \*